Nov. 15, 1932. A. L. HALLIDAY 1,887,839
MOTOR VEHICLE CONTROL DEVICE
Filed April 6, 1931
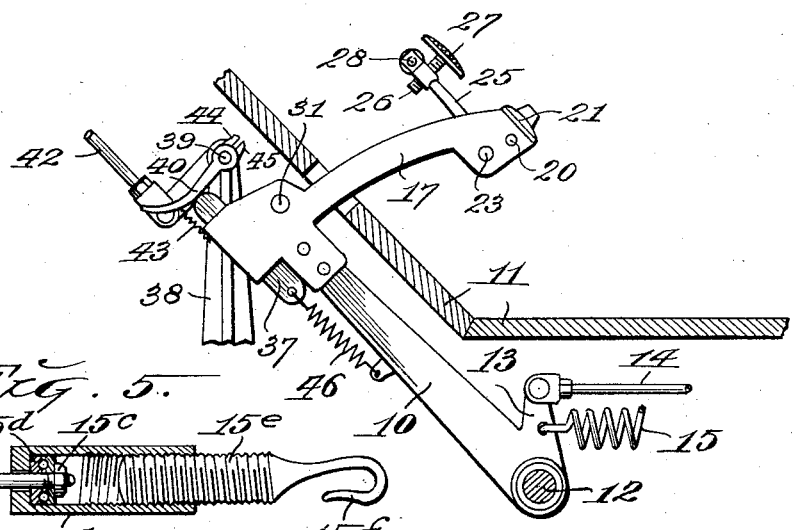
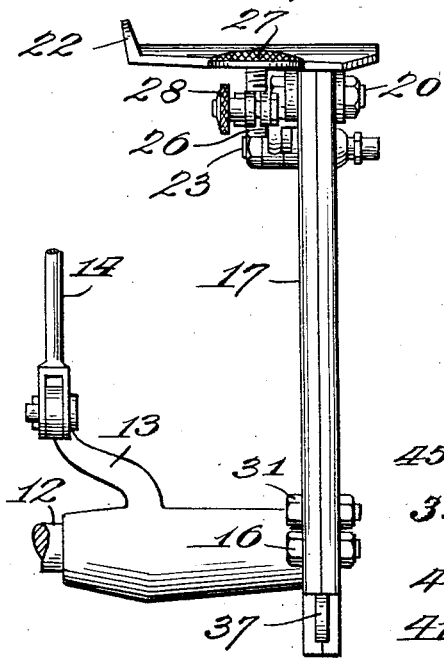
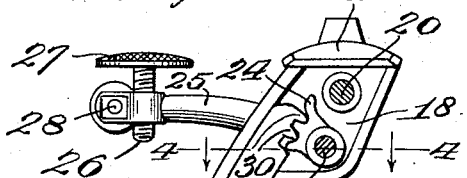
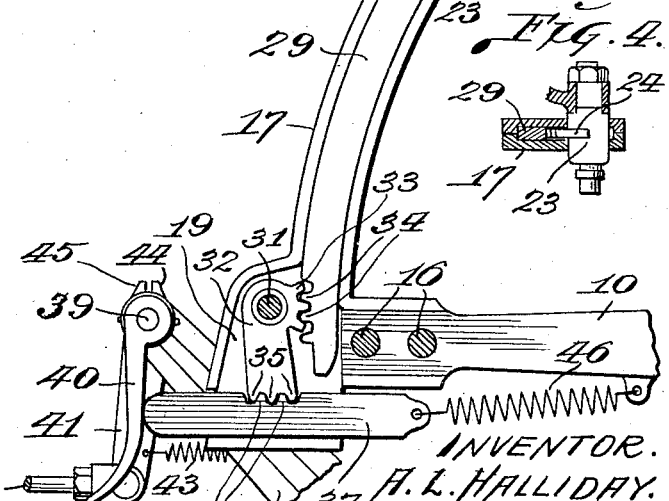
INVENTOR.
A. L. HALLIDAY.

Patented Nov. 15, 1932

1,887,839

UNITED STATES PATENT OFFICE

ALONZO LEWIS HALLIDAY, OF VENTURA, CALIFORNIA, ASSIGNOR OF ONE-HALF TO ARTHUR L. WILLIAMS, OF VENTURA, CALIFORNIA

MOTOR VEHICLE CONTROL DEVICE

Application filed April 6, 1931. Serial No. 528,082.

My invention relates to motor vehicle control devices and more particularly to a combination foot brake and gaseous fuel admission control device that may be conveniently utilized on all vehicles that are equipped with pedally operated brakes and which employ internal combustion engines as motive power.

In practically all motor vehicles now in general use, the brake actuating lever or pedal and the gaseous fuel control generally termed the accelerator, are two separate elements or structures and in the operation of the motor vehicle one foot of the operator, generally the right foot, must necessarily shift from the accelerator to the brake actuating pedal and vice versa in controlling the operation of the vehicle and in emergencies the operator is prone to become confused, with the result that the wrong control device is actuated, thereby causing an accident and it is one of the principal objects of my invention to combine the gaseous fuel admission device or the accelerator with the brake actuating lever so as to render the operation and control of the vehicle more facile and consequently minimizing the possibility of accidents and the attendant loss of life and property.

It is the principal object of my invention to combine with the usual brake pedal, relatively simple, practical and conveniently operated means that will enable the foot of the operator that is positioned on the brake pedal to readily actuate the accelerator or equivalent structure that controls the admission of gaseous fuel to the intake manifold of the internal combustion engine and thus it is possible for the operator with one foot to control both the application of the brakes and the admission of gaseous fuel to the engine, with the result that a more facile control for the equipped vehicle is provided and accidents and casualties arising from the operation of automobiles is minimized.

In a co-pending application for patent filed April 6, 1931, Serial No. 528,081, I have disclosed a control device that is designed for the same purpose as my present invention. In said co-pending application a foot plate is mounted for tilting movement on the upper portion of the brake pedal and the operation of said tilting plate imparts swinging movement to a lever and which latter actuates the gaseous fuel admission control means.

In my present invention, the foot plate on the upper portion of the brake pedal is stationary and movement is imparted to the gaseous fuel admission control means by sliding and rocking parts that are associated with the brake pedal and which are actuated by a leverlike member that is depressed by a slight tilting movement of the foot that is positioned on the fixed foot plate at the upper end of the brake pedal.

With the foregoing and other objects in view, my invention consists in certain novel features of construction and arrangement of parts that will hereinafter be more fully described and claimed and illustrated in the accompanying drawing in which:

Fig. 1 is a vertical longitudinal section taken through the floor boards of an automobile and showing my improved control device in side elevation.

Fig. 2 is a vertical section taken through the center of the control device.

Fig. 3 is a front elevational view of my improved control device.

Fig. 4 is a horizontal section taken on the line 4—4 of Fig. 2.

Fig. 5 is a sectional view of a device that is utilized for adjusting the tension of the spring that returns the brake pedal to its normal position.

Referring by numerals to the accompanying drawing which illustrates a practical embodiment of my invention, 10 designates an arm or lever that is disposed beneath the floor boards 11 of an automobile and the lower end of said arm is journaled on a transverse rod or shaft 12.

Projecting upwardly from the lower portion of this arm is a short arm 13, to which is pivotally connected one end of a pull rod 14 that extends rearwardly and is connected in the conventional manner to the brake setting mechanism.

Connected to arm 13, is one end of a retractile coil spring 15, which tends to normally maintain the arm 10 in its normal position and to resist forward and downward swinging movement of said arm.

In order that the tension of spring 15 may be adjusted, the rear end of said spring is connected to a rod 15a that extends into a tubular housing 15b, and seated on the end of said rod is a nut 15c. An antifriction bearing 15d is interposed between nut 15c and the end of housing 15b, and screw seated in the rear end of said housing 15b is a short threaded rod 15e on the outer end of which is formed a hook 15f that is adapted to engage a fixed part of the motor vehicle body or chassis.

Secured in any suitable manner, preferably by means of bolts or rivets 16 to the upper forward end of arm 10, is the lower end of a housing 17, preferably formed in two parts to facilitate manufacture and assembly and this housing extends upwardly through an opening in the floor boards 11.

The upper portion of housing 17 is slightly enlarged to form a chamber 18 and the lower portion of said housing immediately in front of the point of connection with arm 10, is enlarged to form a chamber 19.

Secured to the upper portion of housing 17, preferably by means of a transverse pin or bolt 20, is a foot plate 21, that is adapted to be engaged by that portion of the operator's foot between the heel and ball of the foot and to prevent the foot from sliding laterally on said plate a lug 22 is formed integral with and projects upwardly from the right hand end of said plate.

Journaled in the side walls of the housing 17 and disposed just below the pin or bolt that secures the foot plate to the upper end of said housing, is a pin or bolt 23, to which is secured in any suitable manner, a toothed segment 24 and which latter occupies the chamber 18 in the upper portion of housing 17.

Secured in any suitable manner to one end of pin or bolt 23, that projects laterally from housing 17, is a short forwardly projecting arm 25, the forward end portion of which is bifurcated and provided with a vertically disposed threaded bearing for a threaded shank 26 and which latter carries at its upper end a small foot plate or button 27.

Passing through the bifurcated portion of arm 25 in front of the bearing for the threaded shank 26, is the shank of a set screw 28 and which latter when tightened clamps the shank 26 in its adjusted position in the bifurcated portion of arm 25.

Arranged for sliding movement through housing 17, is a bar 29 and formed on the upper rear edge thereof is a series of teeth 30 that engage the teeth of segment 24.

Extending transversely through the side walls of that portion of the housing 17 that encloses chamber 19, is a pin or bolt 31 and journaled thereon within chamber 19, is a bell crank 32.

Formed on the outer end of the short arm of this bell crank is a series of teeth 33, that engage with corresponding teeth 34, that are formed on the lower portion of sliding arm 29.

Formed on the lower end of the long arm of bell crank 32, is a series of teeth 35, that engage corresponding teeth 36, that are formed in the upper portion of a bar 37 and the latter being mounted for sliding movement through the lower portion of housing 17.

Secured to a fixed part of the chassis beneath the floor boards in front of arm 10 and the housing carried thereby, is a post or bracket 38 and journaled in the upper end thereof, is a short transversely disposed shaft 39.

Suitably secured to one end of this shaft is a depending plate 40, that is adapted to be engaged by the forward end of bar 37 as the same is projected forwardly through the lower portion of housing 17.

Suitably secured on the opposite end of shaft 39, is a depending crank arm 41 and pivotally secured to the lower end thereof, is a rod 42, of other suitable connection that extends to the accelerator or other conventional means that is associated with the internal combustion engine of the vehicle for controlling the flow of gaseous fuel to the intake manifold of the engine.

Arranged between the lower portion of arm 41 and the post or bracket 38, is a retractile spring 43 which normally holds said arm at its rearward limit of movement. When so positioned the accelerator or other similar structure is in its normal or inactive position. The rearward swinging movement of arm 41 and contact plate 40 is limited by engagement of a lug 44 that projects from the upper end of contact plate 40, with a stop lug 45 on the upper portion of the bearing for shaft 39.

A retractile spring 46 is arranged between the rear end of bar 37 and the intermediate portion of arm 10 and said spring normally holds said bar 37 at its rearward limit of movement. In Fig. 2 the sliding bar 29 is shown at an intermediate position or moved part way downwardly as a result of foot pressure on plate 27, and when so positioned sliding bar 37 has been moved a short distance forwardly so as to partially open or actuate the accelerator or other gaseous fuel control means.

The engagement of the upper one of the teeth of segment 24 against shaft 20 limits the upward sliding movement of the rack bar 29, and the engagement of the lower end of said rack bar against the upper edge of bar 37 limits the downward movement of said rack bar.

Under normal conditions, one foot of the operator of the automobile rests on plate 21 and to apply the brakes, it is only necessary for the operator to apply foot pressure to the brake pedal, thereby moving the same downwardly with a swinging movement upon its axis, the shaft 12, and as such movement takes place, arm 13 will be swung forwardly, thereby imparting movement to pull rod 14 that is connected to the brake setting arms and levers. This action of setting the brakes is resisted by retractile spring 15 and when foot pressure on plate 21 is relieved the power stored in spring 15 will return the brake pedal to its normal position.

When the operator desires to actuate the accelerator to increase the flow of gaseous fuel into the intake manifold of the engine, the forward or ball portion of the foot is moved downwardly during which movement the foot fulcrums on the plate 21 and this downward pressure applied to plate or button 27, swings arm 25 upon its fulcrum, which is the pin or bolt 23 and the engagement of the teeth 24 of the segment carried by shaft 23, with the teeth 30 at the upper end of bar 29, will cause said bar to slide downwardly through housing 17 and the engagement of teeth 34 on said bar with the teeth 33 on the short arm of bell crank 32, will rock said bell crank upon pin or shaft 31.

As bell crank is thus rocked, the engagement of teeth 35 on the lower end of the long arm of said bell crank with teeth 36 of bar 37, will move the latter forwardly a short distance against the resistance offered by retractile spring 46 and the engagement of the forward end of said sliding bar will swing contact arm 40 forwardly and upwardly and, through shaft 39, such motion will be correspondingly transmitted to crank arm 41, to which rod 42 is connected.

The movement of rod 42 thus actuated, will be imparted to the accelerator or other gaseous fuel flow control mechanism so as to increase the flow of gaseous fuel to the intake manifold of the engine and such condition will exist as long as foot pressure is applied to the plate or button 27.

As soon as foot pressure upon button 27 is relieved, the actuated parts, namely: arm 25, toothed segment 24, sliding bar 29, bell crank 32 and sliding bar 37, will be returned to their normal positions under the influence of retractile spring 46 and arm 41 and contact plate 40 will return to their normal positions under the influence of retractile spring 43.

To regulate the tension of retractile spring 15 it is only necessary to rotate tubular housing 15b so as to shorten or lengthen the distance between threaded rod 15c and the rod 15a that is connected to spring 15.

In the operation of an automobile, it is the general practice to increase the flow of gaseous fuel to the engine by means of the accelerator immediately after the brake has been released and likewise to apply the brake immediately after the accelerator has been released or cut off and my improved control device, which is relatively simple in construction, is highly effective in accomplishing these desirable results.

An especially desirable feature of my invention, is the combining of the accelerator actuating means with the brake pedal, for by so doing the operation of both brake pedal and accelerator actuating means, may be accomplished by natural and convenient movements of the foot that is applied to the foot plate of the brake pedal and such arrangement does not necessitate shifting of the foot from the brake pedal to the accelerator actuating member and vice versa and which latter practice prevails in practically all the standard makes of automobiles.

While I have shown and described a motor vehicle control device which is effective in actuating the gaseous fuel control admission means, as well as the foot brake pedal, it will be understood that the means associated with the brake pedal and comprising the plate 27, arm 25, rack plate 29, bell crank 32, and sliding bar 37, may be utilized for the actuation and control of steam or other fluid pressure utilized in the operation of motor vehicles, or for controlling an electric current from a suitable source of supply to a motor.

Thus it will be seen that I have provided a motor vehicle control device that is relatively simple in construction, inexpensive of manufacture and very effective in performing the functions for which it is intended.

It will be understood that minor changes in the size, form and construction of the various parts of my improved motor vehicle control device may be made and substituted for those herein shown and described without departing from the spirit of my invention, the scope of which is set forth in the appended claims.

I claim as my invention:

1. The combination with an automobile brake pedal provided at its upper end with a foot rest and an internal combustion engine gaseous fuel flow control actuating means, including a contact member, of means including a pair of members mounted for sliding movement upon the brake pedal, one of which members is adapted to engage the contact member of the gaseous fuel flow control actuating means, a pedally actuated lever fulcrumed on the upper portion of the brake pedal for imparting movement to the other one of said sliding members, a foot plate adjustably mounted on said lever in front of the foot rest on said pedal and means for securing said foot plate in differently adjusted positions.

2. The combination with an automobile brake pedal and an internal combustion engine gaseous fuel flow control actuating means, including a contact member, of a member arranged for sliding movement upon a portion of the brake pedal, a pedally actuating lever fulcrumed on said pedal and connected to the upper portion of said sliding member for imparting movement thereto, a member arranged for sliding movement on said brake pedal and disposed substantially at right angles to the first mentioned sliding member and a bell crank fulcrumed on the lower portion of said brake pedal between the two sliding members and having toothed engagement therewith.

3. The combination with an automobile brake pedal provided at its upper end with a foot rest and an internal combustion engine gaseous fuel flow control actuating means, including a contact member, of a member arranged for sliding movement on said brake pedal, a pedally actuating lever fulcrumed on said brake pedal and connected to said member for imparting sliding movement thereto, a foot plate adjustably mounted on said lever in front of said foot rest, means for securing said foot plate in differently adjusted positions and means mounted for operation on said brake pedal and adapted to be actuated by said sliding member for imparting movement to said contact member.

4. The combination with an automobile brake pedal provided at its upper end with a foot rest and an internal combustion engine gaseous fuel flow control actuating means, including a contact member, of a member arranged for sliding movement on the brake pedal, a lever fulcrumed on the upper portion of said brake pedal and connected to said member for imparting sliding movement thereto, a foot plate adjustably carried by said lever in front of said foot rest and means including a bell crank having toothed portions mounted for operation on said brake pedal and adapted to be actuated by said sliding member for engaging and actuating said contact member.

5. The combination with an automobile brake pedal and an internal combustion engine gaseous fuel flow control actuating means, including a contact member, of a member arranged for sliding movement on the brake pedal, a lever fulcrumed on the upper portion of said brake pedal and connected to said member for imparting sliding movement thereto, a pedal contact member adjustably carried by said lever, means for locking said pedal contact member to said lever.

6. In a motor vehicle control device, the combination with a brake pedal and the gaseous fuel flow control means for an internal combustion engine, of spring held means arranged for sliding movement on said brake pedal for engaging and actuating said gaseous fuel flow control means, a pedally actuated lever fulcrumed on said brake pedal and means including a sliding bar that is engaged by said pedally actuated lever and a bell crank that is actuated by said sliding bar for engaging and imparting movement to said spring held sliding means.

7. In a motor vehicle control device, the combination with a brake pedal having a hollow portion and the gaseous fuel flow control means for an internal combustion engine, of spring held means mounted for sliding movement within the hollow portion of said brake pedal for engaging and actuating said gaseous fuel flow control means, a bar arranged to slide bodily through the hollow portion of said brake pedal, a bell crank fulcrumed on said brake pedal and having toothed engagement with said sliding bar and spring held sliding means and a pedally actuating lever fulcrumed on the hollow portion of said brake pedal and having toothed engagement with the upper portion of said sliding bar.

8. In a motor vehicle control device, the combination with a brake pedal having a hollow portion and the gaseous fuel flow control means for an internal combustion engine, of spring held means mounted for sliding movement within the hollow portion of said brake pedal for engaging and actuating said gaseous fuel flow control means, a bar arranged to slide bodily through the hollow portion of said brake pedal, a bell crank fulcrumed on said brake pedal and having toothed engagement with said sliding bar and spring held sliding means, a pedally actuating lever fulcrumed on the hollow portion of said brake pedal and having toothed engagement with the upper portion of said sliding bar and a foot contact plate adjustably carried by said lever.

9. In a motor vehicle control device, the combination with a brake pedal having a hollow portion and the gaseous fuel flow control means for an internal combustion engine, of a bar arranged to slide bodily lengthwise through the hollow portion of the brake pedal, a lever fulcrumed on the upper portion of said brake lever and having toothed engagement with the upper portion of said sliding bar, a member arranged for sliding movement through the lower end of the hollow portion of said brake pedal and adapted to engage the gaseous fuel flow control means and a bell crank fulcrumed in the hollow portion of the brake pedal and having toothed engagement with the lower portion of said sliding bar and with said gaseous fuel control actuating member.

In testimony whereof I affix my signature.

ALONZO LEWIS HALLIDAY.